United States Patent Office.

MARSHALL P. SMITH, OF BALTIMORE, MARYLAND.

Letters Patent No. 109,068, dated November 8, 1870.

IMPROVEMENT IN DRYING AND PRESERVING APPLES.

The Schedule referred to in these Letters Patent and making part of the same.

*To all whom it may concern:*

Be it known that I, MARSHALL P. SMITH, of the city and county of Baltimore, and State of Maryland, have invented a new and improved Process for Drying and Preserving Apples, of which the following is a specification.

I take apples in the raw state, either whole or cut into pieces or slices. I then subject them to the action of hot water or steam for about five minutes, or more or less, varying with the nature of the fruit. I then dry them by natural or artificial heat.

The effect of the hot water or steam is to destroy all germs of animal life, to greatly improve the color and quality of the dried fruit, and to fix and preserve the natural taste, so that when cooked it can hardly be distinguished from the fresh undried fruit.

I do not claim the drying of fruits by natural or artificial heat; but

I claim as my invention—

1. The process of drying and preserving apples when combined with the action of hot water or steam, substantially as described.

2. The article of dried apple, when prepared by the process described herein.

MARSHALL P. SMITH.

Witnesses:
W. H. HAYWARD,
M. K. AIKEN.